Patented Apr. 30, 1946

2,399,233

UNITED STATES PATENT OFFICE 2,399,233

PROCESS FOR THE OPACIFICATION OF VITREOUS ENAMELS

Ignaz Kreidl and Werner Kreidl, Cleveland, Ohio

No Drawing. Application March 17, 1941,
Serial No. 383,795

10 Claims. (Cl. 106—40)

This invention relates to a process for the opacification of vitreous enamels and to opacifiers for such enamels. This invention relates more particularly to enamels which are used in the wet process, such as enamels which are prepared from an enamel slip which comprises the use of an enamel frit, clay, water, and other conventional ingredients, the opacifier added to the mill being a gas opacifier.

In the early stages of the development of gas opacification of vitreous enamels, that is, for the opacification of vitreous enamels by means of substances which on firing of the enamel develop finely distributed gas bubbles which, due to the difference in the refractive index of the gas and the enamel frit, cause opacity, it was recognized that not all substances which are capable of producing opacity are equally satisfactory in practical application. It was found that, for example, many substances have a tendency to develop gas at too early a stage of the firing process so that for obtaining a sufficient gas opacity a large excess of such a substance has to be used. It was further found that when using electrolytes as gas opacifiers they will have a tendency to concentrate themselves at the margin of the enamel and give rise to blisters at the margin. It was found that much more satisfactory results and gas bubbles of a better controlled size could be obtained with substances which are adsorbed by the clay whereby probably one or more of the following advantages were obtained. The adsorption will prevent too early a gasification of the opacifier and it will prevent any local concentration of the opacifier and thus cause a more even distribution, and the individual gas bubbles will be obtained in a more desirable size.

Although the use of such substances which are well adsorbed by the clay and are fairly evenly distributed throughout the enamel mass, lead to fully satisfactory commercial enamels, it was observed that certain disadvantages could not be overcome regardless of the selection of the gas opacifier, the clay, or the enamel frit.

An object of the present invention is to provide an improved process for the production of gas opacified enamels from enamel slips prepared at least from an enamel frit, a suspension agent, and a suspension liquid. Another object of the invention is to provide a method for the preparation of gas opacified enamels leading to finished enamels of an improved smoothness and gloss. Another object of the present invention is to provide a gas opacifier which will lead to finished enamels of an improved gloss. Further objects of the invention will become apparent in the following description.

The present invention is based on the discovery that the conventional gas opacifiers, such as gas opacifying substances adsorbed on the suspension agent, have certain inherent disadvantages. It is well known that many of the physico-chemical properties of the enamel slip have an important influence on the finished enamel. Such properties are, for example, the viscosity, the hydration of the clay, the drying properties, the set, the homogeneity of the slurry, and the like. All these properties may influence the ultimate appearance of the finished enamel such as the smoothness of the surface, the gloss, the uniformity of color or opacity, and so on. Thus it becomes apparent that where there is an interaction between the gas opacifying substance and the suspension agent that the chemico-physical properties of the slip will be markedly affected. On the other hand it will be understood that also the gas opacifying substance and the resulting gas opacity will be affected by the chemico-physical behavior of the enamel slip. Accordingly, for optimal results it was necessary to follow exact formulations and any material change of one of the constituents and/or in the amount of one of the constituents in the slip required readjustment of the slip composition.

In the conventional manufacture of gas opacified enamels where clay is used really uniform distribution of the gas opacifying substance could not be obtained since clay, as is known, is a non-uniform material consisting of an intimate mixture of a variety of clay minerals. Moreover, in technical practice, it is customary to use blends of several clays thus creating a still less uniform material. Accordingly, the opacifier will be adsorbed in different ways by the different constituents of the clay or clay mixture and thus even on optimal mechanical distribution the opacifying substance will not be uniformly distributed. Accordingly, on firing gas bubbles will be formed in a relatively wide range of size and during a relatively long temperature interval. The intimate adsorption of the opacifier on the clay will also affect the properties of the clay proper such as its hydration and its colloidal properties whereby its chemical reaction during firing as well as its plastic properties in the slip may be affected. With some gas opacifying substances it was observed that on ageing a certain decrease in adsorption was encountered so that a portion of the gas opacifying substance was present in its non adsorbed state in the enamel slip. All these chemico-physical phenomena occurring in such slips may lead to several defects in the finished enamel or during the manufacture thereof. Thus the uneven distribution of the gas opacifying substance may lead to the formation of an undesirable amount of relatively large gas bubbles and to a certain sensitivity to overfiring of the enamel. The irregularity in the distribution of the gas opacifying substance as well as the change in the chemico-physical behavior of the clay and other slip constituents may lead to a certain decrease in gloss and to a certain lack of smoothness of the finished enamel. The decrease in adsorption of the gas opacifying substance by the clay on ageing may lead to a decrease in opacity and to specks of various appearance. Moreover it was observed that such gas opacifying substances which are adsorbed on the clay may increase the set of the enamel slip a phenomenon which can be counteracted by the addition of certain electrolytes, however, without obviating any of the other phenomena encountered with such opacifiers.

The present invention is based on the fact that all the above described disadvantages can be substantially obviated by appropriately shielding the gas opacifying substance from the suspension agent. This can be done by incorporating the gas opacifying substance prior to its introduction into the slip or slurry in a substance enclosing a substantial portion of the gas opacifying substance and thus shielding it mechanically from the suspension agent. This may be obtained by having the gas opacifying substance shielded in extremely fine capillaries or pores of a substance which, of course, should be resistant to attack by the mill liquor, that is it should neither be dissolved by it nor should its porous structure be destroyed by it. The spaces or pores of the shielding substance in which the gas opacifying substance is incorporated preferably should be of a submicroscopic size that is smaller than $1 \times 10^{-4}$ cm. Such a mechanical shielding of the gas opacifying substance will be more effective if the gas opacifying substance is of such a nature that it cannot diffuse out of the pores of the shielding substance. Therefore, in carrying out the present invention it will be preferable to use gas opacifying substances which cannot be dissolved out of the shielding substance by the suspension liquid or the mill liquor.

In other words as shielding substances, substances will be effective which enclose the gas opacifying substance rather than being enclosed by it. Such substances will distribute the gas opacifying substance in their pores and thus subdivide it in its pores while the amount of the gas opacifying substance exposed on the surface of such substances will be relatively small.

As can be readily seen, the present invention offers a means to incorporate gas opacifying substances in an enamel slip without materially affecting the chemico-physical structure of the slip and this independent of the type and amount of the gas opacifying substance used. In other words by incorporating the opacifying substance in such a shielding substance, it may be obtained that gas opacifying substances which are insoluble in the mill liquor may be introduced into an enamel slip without adsorbing them on the suspension agent and having them nevertheless finely distributed and thus in a very beneficial state.

Accordingly it was found that extremely porous substances such as gels or gel-like substances and especially such inorganic substances will be suitable for the shielding of the gas opacifying substances. Preferably substances will be selected which in the dry state without the gas opacifying substance being incorporated therein have pores of a submicroscopic size and it will also be of great advantage if substances are selected which in the dry state contain at least about 70% by volume air. Furthermore, it will be advantageous to use shielding substances which retain their shielding effect also at elevated temperatures, such as at the drying temperature and preferably to still higher temperatures during the firing process.

Especially suitable for the method of the present invention, therefore, are as shielding substances substances of the type of aerogels. Aerogels are known for their fine porosity and the extremely high air volume they contain. It is well known to those skilled in the art how such aerogels may be prepared and the preparation of such aerogels does not form subject of the present invention. Just by way of illustration it may be mentioned that such aerogels may be prepared by gradually replacing the first liquid phase by other liquids being miscible with the preceding liquid phase but having a lower critical temperature. Finally the last liquid phase will be removed at a temperature above its critical temperature in which way it is obtained that the original gel structure is preserved. Such aerogels as a rule will have pores which have a diameter of approximately $1 \times 10^{-6}$ cm. and will include well above about 80% air by volume, such as about 90% air by volume and more.

It should be noted that the above described gel structures and pore volumes for the shielding substances apply to their structure prior to the incorporation of the gas opacifying substance rather than to their structure after the incorporation. Thus in the case of aerogels it may well happen that when the gas opacifying substance is introduced in the form of a solution that on removal of the solvent after the introduction of the gas opacifying substance the volume will greatly decrease. However, the original structure of the aerogel will have substantially aided in providing for optimal distribution and shielding of the gas opacifying substance by allowing a large volume of solution to penetrate into the pores allowing most of the gas opacifying substance to be enclosed by the shielding substance rather than enclosing it. In this connection it may be mentioned that it will be advisable not to subject the above described opacifier compositions which comprise a gas opacifying substance incorporated into a shielding substance to any too harsh grinding or other method of disintegration. Thus where the gas opacifier composition according to the present invention has to be subjected to a grinding or mixing operation prior to its incorporation into the enamel slip it will be advisable to do this for a short time only or under conditions which will be not too harsh on the shielding substance. If mixing for example has to be carried out in a ball mill it will be often advisable to do the mixing in the presence of water.

Substances which will be suitable as such gels or aerogels are, for example, the gels or aerogels of silica, thorium oxide, zirconium oxide, the rare earth oxides, and of many other inorganic oxides and compounds which are capable of forming gels or aerogels.

As an example of a gel-like substance porous glass may be mentioned such as, for example, is obtained as an intermediate in the preparation of "Vycor" glass. "Vycor" is a trade-mark by Corning Glass Works, Corning, N. Y., and designates a glass which contains about 5% $B_2O_3$, .5% $Na_2O$, the remainder being silica. The production of such a glass is described in British Patent 442,526 of August 8, 1934. As is known to those skilled in the art, this type of high silica glass is obtained from certain boro-silicate glasses which have a tendency towards immiscibility and which can be separated into the two immiscible phases by a heat treatment which gives rise to the formation of one continuous phase of a glass rich in boric oxide and of another one which contains well above 90% silica. The boric oxide phase of this inhomogeneous glass may be leached out with mineral acids and thus a highly porous glass may be obtained. The extreme fineness of the thus formed pores may be judged from the fact that such a porous glass appears optically void under the microscope and that the air inclusions give rise only to a slight bluish opalescence.

This invention, however, is not restricted to any of the above described gels or gel-like substances and it will be clear to those skilled in the art how to select suitable substances in the capillaries of which the opacifying substance will be shielded from the suspension agent, such as especially from the clay and also from the enamel frit. Generally speaking it will be preferable to use such substances in which the gas opacifying substance will be distributed in a finely subdivided form so that even distribution of the gas bubbles on firing is warranted. It will be further advantageous to use as shielding substances for the incorporation of the gas opacifying substances substances which are a fine powder to start with or which can be readily ground or otherwise disintegrated.

In view of the ease of handling, the advantageous physical properties, the compatibility with almost any type of enamel, and the commercial availability the use of silica aerogel will be preferred for incorporating the gas opacifying substances according to the present invention.

As has been mentioned above, it will be preferable to use gas opacifying substances which are not soluble or only slightly soluble on the suspension liquid or mill liquor. Thus for example, in the conventional wet process water insoluble high molecular substances such as dyestuffs and dyestuff intermediates or highly polymerized hydrocarbons, substitution products thereof, such as tars, pitches, resins, and asphalts, may be used. It need not be mentioned that this invention is by no means restricted to any specific gas opacifying substance. As a matter of fact the present invention will in many cases allow of a much improved utilization of gas opacifiers of a not high molecular character.

Of course, where for some reason or other another liquid than water, such as an organic liquid, is used as suspension liquid the gas opacifying substance will be selected accordingly. Thus for example, for a slip prepared with an organic suspension liquid a water soluble dyestuff or any other suitable water soluble gas opacifying substance may be used.

There is no definite relation between the amount of the gas opacifying substance and the shielding substance, and the sufficient amount of the shielding substance will have to be determined by a few preliminary experiments. In any case there should be enough of the shielding substance available so as to enclose a prevalent portion of the gas opacifying substance. The amount necessary for this effect will be different for any type of shielding substance and for any type of shielded gas opacifying substance. Just by way of example it may be mentioned that into silica aerogel 30% by weight of coal tar in a benzol solution may be easily incorporated without having even approached the upper limit which can be effectively incorporated. Accordingly this invention cannot be restricted and is not restricted to any specific ratio between the shielding substance and the shielded substance and it will be understood by those skilled in the art how much of the shielding substance has to be used for any specific gas opacifying substance when used in any specific amount, and vice versa. Generally speaking, it may be mentioned that, to be on the safe side, one rather should use less than the maximum amount of the gas opacifying substance for any given amount of the shielding substance. In this connection it should be mentioned that by using such shielding substances the amount of the gas opacifying proper necessary for obtaining a given opacity will not always be the same as when using the gas opacifying substance without it. In many cases, it will be necessary to use greater amounts of the opacifying substance when using it embedded in such a shielding substance, probably because adsorption by the clay or the frit is prevented. However the theory for this phenomenon may be it is obvious that such shielding substances have a definite influence on the behavior of the enamel from a chemical as well as a physical point of view. In this way it seems to become apparent why the use of such shielding substances diminishes the difficulties encountered with the set up of the enamel slurry, the distribution of gas bubbles with respect to size and number, and why such enamels prepared from such shielded gas opacifying substances have a greatly improved gloss and resistance towards overfiring.

In any case the gas opacifier composition according to the present invention has to be prepared prior to its incorporation into the enamel slip or slurry. The gas opacifier composition according to the present invention may be conveniently prepared by incorporating the gas opacifying substance proper in the shielding substance, for example, in a porous gel-like substance in the form of a solution, suspension or dispersion, or the like so that the opacifying substance proper may thoroughly penetrate the pores of the shielding substance. It will be necessary in most cases to remove the solvent or suspension liquid prior to the use of such a shielded opacifier. Alternatively the gas opacifier composition according to the present invention may be formed simultaneously with the shielding substance. Thus, for example, a solution of both the gas opacifying substance and the raw material capable of forming the shielding substance may be precipitated simultaneously. Thus a solution of a dye and a sol may be mixed together and the precipitated gel will enclose the dye. The thus produced composition may be dried so as to remove any solvent retained in the precipitate. Various other methods for preparing shielded opacifiers will suggest themselves to those skilled in the art, and this invention is not restricted to any specific method of preparing such shielded opacifier compositions. As mentioned above other substances than gel-like substances may be used as long as they have a sufficiently porous structure so as to enclose the gas opacifying substance proper.

The invention may be illustrated by the following examples:

EXAMPLES

The following two enamel frits which are especially suitable for gas opacified enamels and which belong to the type of enamel frits described and claimed in the copending application of Werner Kreidl, S. N. 367,744 of November 29, 1940, were prepared in the usual way.

Frit I

| | | | |
|---|---|---|---|
| Borax | 500 | $B_2O_3$ | 10.0 |
| Feldspar | 460 | $R_2O$ | 10.7 |
| Quartz | 504 | $F_2$ | 9.0 |
| Soda ash | 164 | $Al_2O_3$ | 8.6 |
| Saltpeter | 60 | $SiO_2$ | 52.2 |
| Sodium silico fluoride | 240 | $CaO$ | 1.5 |
| Fluorspar | 40 | $Sb_2O_3$ | 5.5 |
| Kaolin | 162 | | |
| Antimony trioxide | 100 | | 105.5 |

Frit II

| | | | |
|---|---|---|---|
| Borax | 500 | $B_2O_3$ | 10.1 |
| Feldspar | 460 | $R_2O$ | 19.4 |
| Quartz | 489 | $F_2$ | 10.3 |
| Soda ash | 140 | $Al_2O_3$ | 8.5 |
| Saltpeter | 60 | $SiO_2$ | 50.2 |
| Sodium silico fluoride | 280 | $CaO$ | 1.5 |
| Fluorspar | 80 | | |
| Kaolin | 162 | | 100.0 |

Then the following opacifier compositions were prepared:

Opacifier composition A: 84 g. "Santocel" (trade-mark by Monsanto Chemical Company, St. Louis, Mo.), which is a silica aerogel prepared by Monsanto Chemical Corp., was impregnated with a solution of 16 gms. "Du Pont Oil Red" in about 500 ccm. benzol by pouring the dyestuff solution over the silica aerogel and kneading the formed dough for 4 hours in a kneading machine. The resulting mass was then thoroughly dried. "Du Pont Oil Red," trade-mark by E. I. Du Pont de Nemours & Co., Wilmington, Del., is α-naphthalene-azo-β-naphtol.

Opacifier composition B: An opacifier composition was prepared in the same way as under A from 75.5 g. "Santocel" and from a solution of 2.5 gms. "Du Pont Oil Red" in about 500 ccm. benzol.

Opacifier composition C: An opacifier composition was prepared in the same way as under A from 90 g. "Santocel" and from a solution of 10 gms. "Du Pont Oil Yellow" in about 500 ccm. benzol. "Du Pont Oil Yellow," trade-mark by E. I. Du Pont de Nemours & Co., Wilmington, Del., is benzene-azo-dimethyl-aniline.

Opacifier composition D: An opacifier composition was prepared in the same way as under A from 82 g. "Santocel" and from a solution of 18 gms. coal tar in about 500 ccm. benzol.

The following enamel slips were prepared:

| Frit | Clay | Cerium oxide | Opacifier composition | Water |
|---|---|---|---|---|
| | G. | G. | | G. |
| 1000 g. I | 60 | | 2.6 g. A | 500 |
| 1000 g. I | 60 | | 14 g. B | 500 |
| 1000 g. I | 60 | | 4 g. C | 500 |
| 1000 g. I | 60 | | 1.2 g. D | 500 |
| 1000 g. II | 60 | 3 | 2.6 g. A | 500 |
| 1000 g. II | 60 | 3 | 14 g. B | 500 |
| 1000 g. II | 60 | 3 | 4 g. C | 500 |
| 1000 g. II | 60 | 3 | 1.2 g. D | 500 |

The resulting enamel slips were easy to apply and after drying and firing gave smooth, glossy enamels which were very resistant to overfiring.

This invention is to be understood in its broad scope as claimed in the appended claims and not restricted by any of the above examples which are given by way of illustration only. The term "shielding" as used in the description and in the appended claims is to be understood as indicating that the gas opacifying substance proper is at least partially enclosed by a substance to such a degree that adsorption of the gas opacifying substance proper or a material portion thereof by the suspension agent such as clay or other solid mill additions is substantially prevented. The term "incorporated in an aerogel" as used in the description and in the appended claims is meant to indicate that the gas opacifying substance proper has been incorporated in an aerogel regardless of the physical structure of the thus resulting gas opacifier composition subsequent to the incorporation and possible removal of the solvent for the gas opacifying substance proper. As a matter of fact, in most cases an aerogel into which a gas opacifying substance has been introduced by means of a solvent which later has been removed after the incorporation of the gas opacifying substance, will lose its typical structure and not represent any more an aerogel in the strict sense of the word. The term "gel-like" as used in the description and in the appended claims is to be understood as to comprise true gels and substances of a structure approximating such true gels.

What we claim is:

1. In the process for the production of vitreous enamels the step of preparing an enamel slip at least from an enamel frit, clay, water, and a gas opacifying substance being incorporated in the pores of an inorganic gel-like substance which in the dry state and without the gas opacifying substance incorporated therein has pores which are substantially of submicroscopic size and which contains at least about 70% by volume air and which is capable of substantially shielding said gas opacifying substance from the clay and the frit.

2. In the process for the production of vitreous enamels the step of preparing an enamel slip at least from an enamel frit, clay, water, and a gas opacifying substance being an organic compound selected from the group consisting of compounds of high molecular weight, dyestuffs and dyestuff intermediates and being incorporated in the pores of inorganic gel-like substance, which in the dry state and without the gas opacifying substance being incorporated therein has pores of substantially submicroscopic size and contains 70% by volume air, and which is capable of substantially shielding said gas opacifying substance from the clay and the frit.

3. In the process for the production of vitreous enamels the step of preparing an enamel slip at least from an enamel frit, clay, water, and a gas opacifying substance being selected from the group consisting of highly polymerized hydrocarbons, substitution products thereof, tars, pitches, resins, and asphalts and being incorporated in the pores of inorganic gel-like substance, which in the dry state and without the gas opacifying substance being incorporated therein has pores of substantially submicroscopic size and contains 70% by volume air, and which is capable of substantially shielding said gas opacifying substance from the clay and the frit.

4. In the process for the production of vitreous enamels the step of preparing an enamel slip at least from an enamel frit, clay, water, and a gas opacifying substance being substantially insoluble in the mill liquor and being incorporated in a silica aerogel.

5. A gas opacifier composition for vitreous enamels which comprises a gas opacifying substance being incorporated in the pores of an inorganic gel-like substance.

6. A gas opacifier composition for vitreous enamels which comprises a gas opacifying substance being insoluble in the mill liquor and being incorporated in a silica aerogel.

7. A gas opacifier composition for vitreous enamels which comprises a gas opacifying substance which is an organic compound being selected from the group of high molecular substances, dyestuffs and dyestuff intermediates said gas opacifying substance being incorporated in an inorganic aerogel.

8. A gas opacifier composition for vitreous enamels which comprises a gas opacifying substance being a hydrocarbon selected from the group of highly polymerized hydrocarbons, tars, pitches, resins, and asphalts and which is incorporated in an inorganic aerogel.

9. A gas opacifier composition for vitreous enamels which comprises a gas opacifying substance being substantially insoluble in the mill liquor and being incorporated in an inorganic aerogel.

10. In the process for the production of vitreous enamels the step of preparing an enamel slip at least from an enamel frit, clay, water and a gas opacifying substance being substantially insoluble in the mill liquor and being incorporated in an inorganic aerogel.

IGNAZ KREIDL.
WERNER KREIDL.